United States Patent

[11] 3,565,276

| [72] | Inventors | James O'Brien;<br>Richard A. Besso, Palos Verdes Peninsula, Calif. |
|---|---|---|
| [21] | Appl. No. | 763,209 |
| [22] | Filed | Sept. 27, 1968 |
| [45] | Patented | Feb. 23, 1971 |
| [73] | Assignee | Norris Industries, Inc.<br>Los Angeles, Calif. |

[54] ADJUSTING RING FOR ELECTRICAL FLOOR BOXES
2 Claims, 4 Drawing Figs.

[52] U.S. Cl. .................................................. 220/3.3;
 52/221; 220/3.7; 248/56
[51] Int. Cl. ................................................. H02g 3/12,
 H02g 3/14
[50] Field of Search .......................................... 220/3.3,
 3.5; 174/48; 285/42, 205, 206, 200; 52/110;
 137/359; 248/56; 292/357

[56] References Cited
UNITED STATES PATENTS

| 2,847,140 | 8/1958 | Voss ........................... | 220/3.3 |
| 2,978,004 | 4/1961 | Smith .......................... | 285/200X |
| 3,067,436 | 12/1962 | Freibott ....................... | 137/359X |
| 3,222,834 | 12/1965 | Taft ............................ | 52/221 |
| 1,558,772 | 10/1925 | Archer ......................... | 292/357X |
| 2,027,608 | 1/1936 | Moller ......................... | 292/357 |

*Primary Examiner*—Roy D. Frazier
*Attorney*—Huebner & Worrel

ABSTRACT: A two-piece adjusting ring for use with a standard electrical floor box which latter includes a threaded handhole in the top, the adjusting ring including a threaded section or collar rotatable with respect to the box to couple them together at the situs of the installation of the box, and a separate flange adapted to overlie a floor surface or covering closely adjacent the collar and adapted to remain rotationally stationary while the collar is being advanced, the collar and flange being provided with mutually engaging smooth surfaces whereby the collar imparts a thrust upon the flange without rotating the latter.

PATENTED FEB23 1971  3,565,276

INVENTORS.
JAMES O'BRIEN
RICHARD A. BESSO
By Huebner & Worrel
ATTORNEYS.

3,565,276

ADJUSTING RING FOR ELECTRICAL FLOOR BOXES

BACKGROUND OF THE INVENTION

Electrical floor boxes are used when an electrical outlet or fixture is desired at a distance away from any wall outlets in situations where extension cords are unsightly, possible hazardous, and otherwise inconvenient to use. The floor box is mounted in the floor structure below the floor surface, as for example on a subfloor or in the body of a concrete floor. Electrical wiring or conduits run under or through the floor into the box. A threaded widemouthed opening usually referred to as a handhole in the top of the box facilitates access for final connection of the wiring to whatever type outlet or fixture is to be used. An adjusting ring, which screws downwardly into the widemouthed opening, is used in conjunction with a cover plate to functionally cover and aesthetically conceal the floor box.

In prior art floor boxes, adjusting rings such as the one discussed above have been of one-piece construction with an integral flange to bridge any space left by the necessary aperture in floor and floor covering. As the ring is screwed downwardly into the floor box and the flange comes in contact with the floor covering, such as carpet, further rotation of the ring, which is necessary for a tight, secure fit, causes the flange to grab the floor covering and twist it out of shape if it be carpet, or tend to abrade it if it be in the nature of synthetic tile, or wood.

SUMMARY OF THE INVENTION

The invention eliminates the objectionable features of the prior art by making the threaded section or collar as one part and the flange in a separate part.

Interengagement of the two parts is accomplished by providing an annular thrust shoulder on the collar with a smooth bearinglike surface which rotatably engages a complementary annular smooth surface on the flange, whereby threaded advancement of the collar into the box is achieved by rotating the collar, and the latter slips on the flange during the rotation when the flange comes into even slight frictional engagement with the floor element upon which it is to repose.

An additional feature of the invention is to form said annular surface on the flange by a shallow counterbore, the depth of which preferably is equal to the axial measurement of a peripheral rim on the collar the lower face of which constitutes the thrust shoulder mentioned in the preceding paragraph. Such a relationship results in a horizontally even upper surface at the junction of collar and flange.

A further advantage is obtained by forming an annular groove in the undersurface of the flange closely adjacent the inner edge with the surface of the groove left somewhat rough. This provides space for any excess of carpet in the region and when the surface engages the carpet the friction will resist any tendency for the flange to turn with the collar.

A structure as outlined fulfills the objects of the invention one of which is to provide an adjusting ring assembly for a floor box which does not damage, warp, stretch, or otherwise distort the floor surface or covering it contacts.

A further object is to provide an adjusting ring assembly which forms a tight, secure fit between a floor box and a floor surface and is both functional and aesthetically pleasing.

Other objects and advantages of the invention will become apparent from the following description taken in connection with the accompanying drawings. BRIEF DESCRIPTION OF THE DRAWINGS FIG. 1 is an elevation partly in cross section of a floor box outlet combination incorporating the new adjusting ring assembly.

DESCRIPTION OF THE PREFERRED EMBODIMENT

Figure 1:
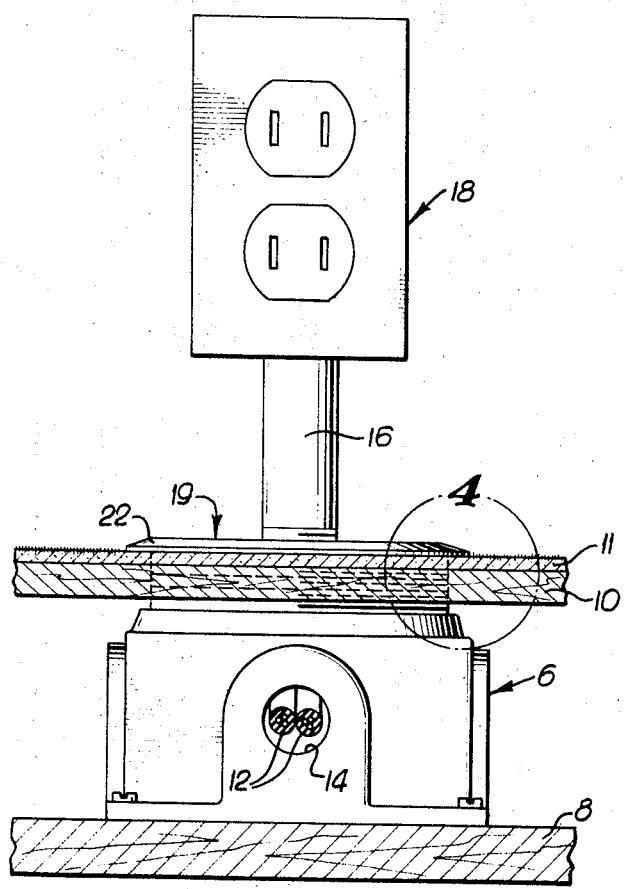
Figure 2:
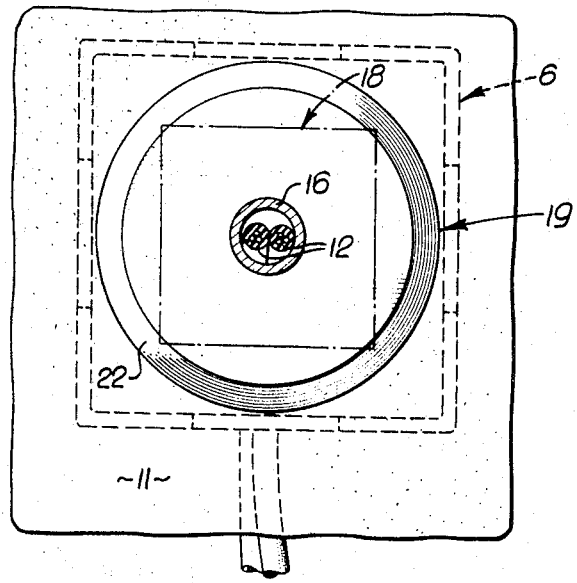
FIG. 2 is a top plan view, partly in section, of the structure shown in FIG. 1.
Figure 3:
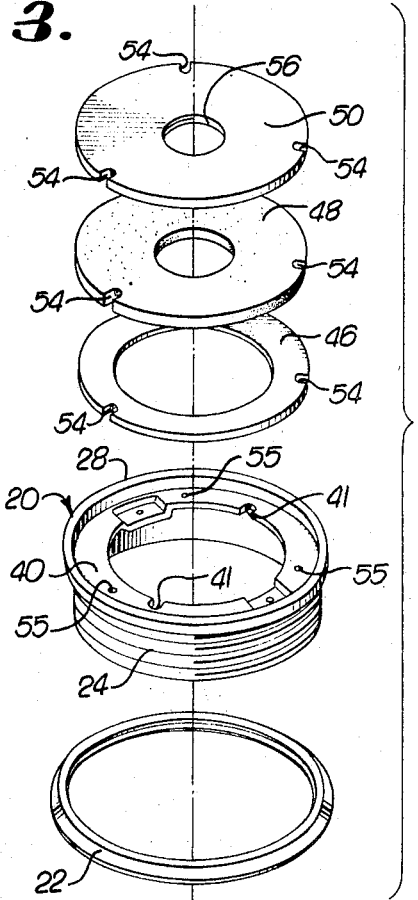
FIG. 3 is an exploded perspective view of the adjusting ring assembly and some accessory parts.
Figure 4:
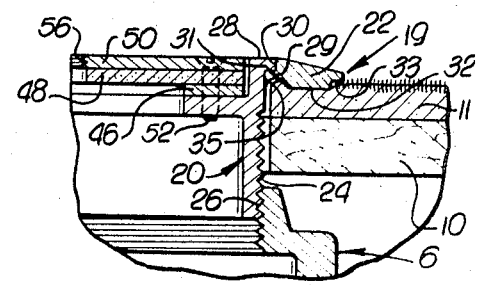
FIG. 4 is an enlarged fragmentary cross section of the area generally designated by circle 4 of FIG. 1.

Referring now to the drawings in detail, FIG. 1 shows a floor box 6 mounted on a subfloor 8, below main floor 10, which latter has a carpet covering 11. Electrical conductors 12 extend into floor box through an opening 14. In this example, a rigid conduit 16 extends upwardly from the floor box 6 and mounts an electrical outlet box 18.

An adjusting ring generally designated 19 includes a threaded collar 20 and a separate flange 22.

Threads 24 of the collar are engaged with threads 26 of the handhole in the box to advance the collar downwardly the required amount to securely clamp the adjusting ring to the box, and provide a mount for a desired receptacle or outlet above the floor.

The collar 20 makes thrust engagement with the flange 22 to press the latter into neat contact against carpet 11. For this purpose the collar is formed with a peripheral rim 28 embodying an annular flat smooth thrust shoulder 29. The flange is formed with an annular notch 30 presenting a smooth flat bearing shelf 31 complementary to the shoulder. The axial dimension of the rim 28 and notch 30 are generally equal, so that the upper surfaces of the collar and contiguous area of the flange lie in the same plane.

The lower surface 32 of the flange bears upon the carpet. This surface which is centrally flat has an undercut 33 around the periphery to afford relief so that the carpet is not visibly compressed in the region immediately adjacent the flange.

Around the inside circumference of the flange bottom is a groove 35 the surface of which preferably is somewhat roughened, so that it will receive any excess carpet and frictional engagement therewith will resist any tendency of the flange to rotate with the collar.

The collar embodies a countersunk annular shelf 40 with diametrically located notches 41 for reception of a spanner wrench (not shown). This shelf will support whatever type of receptacle or outlet is to be used. In the example illustrated, a cover plate assembly, shown as a conduit mount, includes a metal washer 46, a cork (or rubber) washer 48, and a cover plate 50. These are held down by screws 52 extending through notches 54 and threaded into tapped bores 55 in the shelf 40.

The conduit 16 is threadedly secured in a tapped bore 56 in the cover plate 50.

While the invention shown herein is conceived to be the most practical and preferred embodiment, it should be recognized that departures may be made therefrom within the scope of the invention, which is not to be limited to the details disclosed herein but is to be accorded the full scope of the claims so as to embrace any and all equivalent structures and devices.

We claim:

1. For use in conjunction with an electrical floor box element which includes a threaded handhole in the top of the box element and which is mountable entirely below the surface of a floor, a two-part adjusting ring assembly, one part comprising an annular collar in the form of a generally straight cylinder terminating in upper and lower generally vertically aligned ends, the lower end region being threaded for engagement with the threads of the handhole, the upper end region embodying peripheral first flange extending radially outward from the external wall of the cylinder and providing a thrust shoulder on its lower surface and a generally flat tread on its upper surface, a second flange extending radially inward the internal wall of the cylinder and axially intermediate the threaded region and the first flange and providing an annular shelf for reception of finishing and fixture mounting elements, the collar as defined being an integral structure, the second part comprising a separate generally flat thin annular ring having an internal annular notch providing a horizontal seat coincident with and adapted for engagement by the thrust shoulder with a rotatable slip action, the annular ring embodying a lower surface adapted to rest upon a floor and an upper tread surface forming a continuation of the tread surface of the first flange, whereby the collar may be rotated to threadedly advance the collar downwardly relative to the handhole of the box element, and the engagement of the seat of the annular ring by the thrust shoulder provides an axial thrust to clamp down the annular ring on the floor surface or covering without appreciable rotation of such ring, the axial dimensions of the first flange and the internal notch of the ring corresponding so that when the collar and annular ring are fully assembled with the box element the junction of the tread surface of the first flange of the collar and the tread surface of the annular ring lie in the same general horizontal plane.

2. A device as defined in claim 1 in which the first flange embodies an annular straight vertical surface extending between its tread surface and thrust shoulder, and the internal notch of the annular ring being defined in part by an annular straight wall mating with the vertical surface of the first flange, whereby the junction of the tread surface of the first flange and the tread surface of the annular ring are immediately contiguous.